Patented May 12, 1942

2,282,795

UNITED STATES PATENT OFFICE 2,282,795

VITAMIN PRODUCT

Sidney Musher, New York, N. Y., assignor to Musher Foundation Incorporated, New York, N. Y., a corporation of New York No Drawing. Application February 27, 1942, Serial No. 432,645

6 Claims. (Cl. 260—412.1)

This invention relates to the production of vitamin A and D compositions from dehydrated, high vitamin A and D containing livers.

In accordance with this invention, the livers, and particularly fish livers, are first dried preferably to under 15% moisture content.

The livers may be dried by exposure in a relatively thin film under sunlight or at a moderate temperature of about 150° F. or above. The livers are desirably dried, however, under reduced pressure or in the presence of an inert gas.

After the high vitamin containing livers have been dehydrated to below about 15% and preferably to 10% or less total moisture, they are ground or macerated with a glyceride oil and then expressed to produce a high vitamin containing and stable oil. The oil is found to be particularly stable to oxidative deterioration where the livers are dehydrated at an elevated temperature of above 150° F. and desirably at a temperature of 250° F. or more.

After the dehydrated livers are ground or macerated with the glyceride oil, the combination is then expressed in a plate press to remove the oil which will contain substantially all of the vitamins A and D as well as their vitamin constituents originally present in the livers, leaving behind a residue which is valuable for food purposes.

The finely divided dehydrated livers may be ground with a glyceride oil to a finely milled oily paste using, for example, three parts by weight of cod liver oil to one part by weight of the dehydrated livers, the grinding being continued until the paste becomes perfectly smooth.

The grinding is preferably conducted using stone or iron rollers operating on a stationary plate whereby a fine milling and breakdown of the dehydrated liver cells are obtained.

The mixture may also be put through a colloid mill in order to break into the individual cells of the dehydrated livers and to permit the oil contained in those livers to be released and replaced by the added oil.

The time of grinding may vary from about 15 seconds upwards although generally a grinding period of about 30 seconds is sufficient thoroughly to break through the cell structure of the dehydrated livers.

The paste thus obtained is desirably not subjected to a screw type expression for the paste is not readily held in the grinding chamber. Instead, the paste is placed in a pot type press whereby a tight fitting piston operating under great pressure expresses the oil from the paste without the paste exuding from the sides of the press or by the use of a hydraulic or plate press. Thus the paste is expressed in batches.

The oil thus obtained contains substantially all of the vitamins of the dehydrated livers and may desirably be used as a high vitamin containing oil for pharmaceutical purposes, for fortifying other oils, preferably glyceride oils, or other foods, and particularly for addition to animal feeds such as in preparing complete poultry feeds.

The high vitamin containing oil may also be homogenized into milk, preferably skimmed, and then concentrated or dried so that the vitamins are placed into substantially water soluble or milk soluble condition and used for addition to aqueous human food or animal feed compositions such as to milk, candies, confections, beverages, ice cream, bakery products, etc.

The vitamin containing oil may, for example, be homogenized with skim milk on the basis of adding between 3% and 7% of the oil to skim milk having 9% total milk-solids-not-fat and, after homogenizing, dried or concentrated to about 70% total solids or more.

The oil may also be dispersed through blackstrap molasses, the molasses serving as the continuous phase of the dispersion. Either the oil or the dispersion of the oil in molasses or milk may be used for combination with grasses, cereals, brans and similar dry feedstuffs.

The oil used for forming into a paste with the dehydrated livers is desirably a glyceride oil of fish origin, such as cod liver oil, halibut liver oil, tuna fish liver oil, shark liver oil, herring oil, mackerel oil, salmon oil, or menhaden oil. Other glyceride oils which may also be utilized are the animal and vegetable oils and fats, in crude virgin, refined or hydrogenated condition, such as olive oil, cottonseed oil, sesame oil, peanut oil, soya bean oil, corn oil, and lard.

Although the proportion of 3 parts of cod liver oil to every 1 part of dehydrated livers by weight is specifically called for and is the desirable proportion to use in order to produce the most desirable vitamin-cod liver oil combination, other proportions may be employed varying from 1 part to about 5 parts by weight of the glyceride oil to every 1 part of the dehydrated livers.

The oily viscous paste before expression desirably contains over about 30% total solids and preferably 35% or more total solids, other than oil.

It is undesirable to use larger proportions of the glyceride oil because the dehydrated livers are then diluted in too large a quantity of the added glyceride oil.

Where desired, the dehydrated livers may before grinding be allowed to soak for a period of from 15 minutes to 12 hours in an equal amount by weight of the glyceride oil in order to soften the cellular structure and enable the paste to be formed more readily.

The residue which is obtained after the paste is expressed by means of the pot type or plate press is desirably subjected to a second expression in a screw type expeller to remove an additional quantity of the dehydrated livers and added oil combination and in order to obtain a greater yield. Although the paste cannot be handled by the ordinary screw type expeller, after the paste has been expressed by means of the special piston type or plate expeller, the residue may then be handled by the ordinary screw type expeller, or it may be solvent extracted.

Among the livers that may be utilized for dehydration and preparation in accordance with the present invention are included particularly the high vitamin A and D containing fish livers such as cod livers, halibut livers, tuna fish livers, shark livers as well as herring and salmon waste.

There may also be utilized the animal livers such as livers which are obtained from horses, sheep, cows and hogs. In all cases, the livers are first substantially dehydrated to less than 20% moisture and desirably to 15% or less total moisture content followed by grinding or macerating with a glyceride oil and expressing in order to obtain the high vitamin oils of the present application.

The oils obtained in accordance with the procedure of the present invention contain substantially all of the vitamins of the livers and this oil may be widely used for pharmaceutical purposes, for fortifying other oils, but preferably glyceride oils, or other foods, for animal feed such as in preparing complete poultry feeds as well as for other similar purposes.

It has also been found that particularly where, during the grinding operation, the paste is subjected to an elevated temperature of in excess of 200° F. and desirably to about 250° F. or more, and even to as high as 300° F. to 400° F. for short periods, the oil obtained by expression of the paste is of greater value and utility than where the elevated temperature is not applied to the paste. The vitamin containing oil from the heat treated paste has a better odor and flavor and the vitamins contained in that are much more resistant to oxidative deterioration.

It is not known why it is that when the paste is subjected to the elevated temperature treatment followed by expression, the resultant vitamin containing oil has improved stabilization and value for pharmaceutical and food purposes, but apparently some reaction occurs at the elevated temperature between the glyceride oil contained in the paste and the solids of the paste to obtain the enhanced effect.

The results of the present invention are obtained only when these dehydrated livers are ground with the added oils to completely absorb and break the cellular structure. Unless the grinding procedure takes place using a sufficient quantity of oil to produce the oily paste, but at the same time a minimum quantity of oil so that an oily paste is actually produced, the most beneficial results are not obtained.

Although a glyceride oil is more particularly called for under this invention, there may much less preferably be utilized refined white mineral oil for admixture with the dehydrated livers to form a paste and for subsequent expression of the paste as indicated above.

The oil obtained in accordance with the present invention may very desirably be used for homogenization or for preparation into colloidal form in a carrier consisting of molasses, preferably blackstrap molasses, or in the concentrated acidified water extract of corn. The coating of the individual globules of the oil obtained in accordance with the present invention with the molasses or extract will materially retard vitamin loss and the oil obtained in accordance with the present invention is ideally suited for this purpose.

The vitamins contained in the oil of the present invention may be concentrated by removal of the unsaponifiable portion and a highly stable and potent fraction will be obtained. For example, the vitamin containing oil removed following grinding of the dehydrated animal livers in the glyceride oil and expression of the oil therefrom may be subjected to alcohol extraction procedures to remove the unsaponifiable fraction in order to obtain highly potent vitamin concentrates.

The oil may also be distilled under sub-atmospheric pressures to remove desirable fractions therefrom.

It is also possible for the oil which is obtained after expression from the ground dehydrated liver combination to be used again in the preparation of another lot of dehydrated livers, the oil being used a succession of times thereby resulting in a concentration of the vitamins originally contained in the livers.

Moreover, where it is desirable for the final oil to have a combination of different oil soluble vitamins, it may be desirable to use, for example, wheat germ oil as the basic oil for grinding with the dehydrated livers, followed by expression of the oil containing the combination of vitamins.

This application is a continuation in part of application, Serial No. 310,555, filed December 22, 1939.

Having described my invention, what I claim is:

1. A method of extracting a stable vitamin containing oil from dehydrated animal livers which comprises grinding said livers in low moisture condition with an oil selected from the group consisting of the glyceride oils and mineral oil to form an oily viscous paste containing in excess of about 30% total solids other than oil and until the oil has been extracted from said dehydrated livers and then expressing the oil from the solids, whereby there is produced a high quality and highly stable oil.

2. A method of extracting a stable vitamin containing oil from dehydrated animal livers which comprises grinding said animal livers in low moisture condition with a glyceride oil to form an oily viscous paste until the oil has been extracted from said dehydrated livers and then expressing the oil from the solids, whereby there is produced a high quality and highly stable oil.

3. A method of extracting a stable vitamin containing oil from dehydrated fish livers which comprises grinding said fish livers in low moisture condition with a glyceride oil to form an oily viscous paste until the oil has been extracted from said dehydrated livers and then expressing the oil from the solids, whereby there is produced a high quality and highly stable oil.

4. A stable glyceride oil carrying the oil soluble constituents of a finely divided oily paste of dehydrated animal livers, extracted after grinding of the glyceride oil with the dehydrated animal livers, said paste containing in excess of about 30% total solids other than oil.

5. A stable glyceride oil carrying the oil soluble constituents of a finely divided oily paste of dehydrated fish livers, extracted after grinding of the glyceride oil with the dehydrated fish livers, said paste containing in excess of about 30% total solids other than oil.

6. A method of extracting an oil from dehydrated animal livers which comprises grinding said livers in low moisture condition at a temperature of above at least 200° F. with an oil selected from the group consisting of the glyceride oils and mineral oil to form an oily viscous paste containing in excess of about 30% total solids other than oil, and then expressing the oil from the solids, whereby there is produced a high quality and highly stable oil.

SIDNEY MUSHER.